United States Patent
Shin et al.

(10) Patent No.: US 8,182,106 B2
(45) Date of Patent: *May 22, 2012

(54) SURFACE LIGHT SOURCE USING WHITE LIGHT EMITTING DIODES AND LIQUID CRYSTAL DISPLAY BACKLIGHT UNIT HAVING THE SAME

(75) Inventors: Jae Hong Shin, Suwon (KR); Hun Joo Hahm, Sungnam (KR); Hyung Suk Kim, Suwon (KR); Chang Ho Shin, Incheon (KR); Dae Yeon Kim, Suwon (KR); Chul Hee Yoo, Suwon (KR); Dong Hyun Cho, Suwon (KR)

(73) Assignee: Samsung LED Co., Ltd, Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,946

(22) Filed: Mar. 11, 2011

(65) Prior Publication Data

US 2011/0157492 A1    Jun. 30, 2011

Related U.S. Application Data

(63) Continuation of application No. 12/078,717, filed on Apr. 3, 2008, now Pat. No. 7,946,724.

(30) Foreign Application Priority Data

Aug. 27, 2007    (KR) .......................... 10-2007-086197
Mar. 11, 2008    (KR) .......................... 10-2008-022437

(51) Int. Cl.
*F21V 21/00* (2006.01)

(52) U.S. Cl. ...... 362/97.3; 362/97.2; 362/230; 362/231; 362/249.06

(58) Field of Classification Search .................. 362/230, 362/231, 249.02, 249.06, 249.14, 84, 97.1–97.3, 362/293; 349/61–64; 313/500, 502
See application file for complete search history.

(56) References Cited

U.S. PATENT DOCUMENTS

| | | | |
|---|---|---|---|
| 6,686,691 | B1 | 2/2004 | Mueller et al. |
| 7,293,907 | B2 | 11/2007 | Kim et al. |
| 7,300,175 | B2 | 11/2007 | Brukilacchio |

(Continued)

FOREIGN PATENT DOCUMENTS

EP    1 521 235 A    4/2005

(Continued)

OTHER PUBLICATIONS

Communication dated May 24, 2011 from the Taiwanese Intellectual Property Office in counterpart application No. 097109276.

(Continued)

*Primary Examiner* — Thomas Sember
(74) *Attorney, Agent, or Firm* — Sughrue Mion, PLLC

(57) ABSTRACT

There is provided a surface light source using white light emitting diodes including: a plurality of white light emitting diodes arranged at a predetermined distance from one another, wherein the white light emitting diodes are arranged such that a light emitting diode unit defined by each of the white light emitting diodes and corresponding ones of the white light emitting diodes disposed at a closest distance from the each white light emitting diode has a central light amount ranging from 80% to 120% with respect to an average light amount of the white light emitting diodes.

16 Claims, 10 Drawing Sheets

U.S. PATENT DOCUMENTS

| | | |
|---|---|---|
| 7,304,694 B2 | 12/2007 | Negley et al. |
| 7,311,858 B2 | 12/2007 | Wang et al. |
| 7,648,254 B2 * | 1/2010 | Yoo et al. .................. 362/249.01 |
| 7,649,593 B2 * | 1/2010 | Yoon et al. ....................... 349/69 |
| 7,682,850 B2 | 3/2010 | Harbers et al. |
| 2004/0256974 A1 | 12/2004 | Mueller-Mach et al. |
| 2005/0073495 A1 | 4/2005 | Harbers et al. |
| 2006/0028122 A1 | 2/2006 | Wang et al. |
| 2006/0244879 A1 | 11/2006 | Yoon et al. |
| 2006/0285324 A1 | 12/2006 | Ansems et al. |
| 2007/0013647 A1 | 1/2007 | Lee et al. |
| 2007/0153515 A1 | 7/2007 | Hong et al. |
| 2007/0187705 A1 | 8/2007 | Tanaka et al. |
| 2007/0258266 A1 * | 11/2007 | Baek et al. .................... 362/612 |
| 2009/0032827 A1 | 2/2009 | Smits |

FOREIGN PATENT DOCUMENTS

| | | |
|---|---|---|
| EP | 1 717 633 A1 | 11/2006 |
| EP | 1 830 415 A1 | 9/2007 |
| JP | 11-162233 A | 6/1999 |
| JP | 2004-320024 A | 11/2004 |
| JP | 2005-100800 A | 4/2005 |
| JP | 2005-243347 A | 9/2005 |
| JP | 2006-19736 A | 1/2006 |
| TW | 200506026 A | 2/2005 |
| TW | 200519487 A | 6/2005 |
| TW | 200619356 A | 6/2006 |
| TW | 200639527 A | 11/2006 |
| WO | 01/24229 A2 | 4/2001 |
| WO | 2006/068141 A1 | 6/2006 |

OTHER PUBLICATIONS

Communication dated Jul. 13, 2011 from the State Intellectual Property Office of P.R. China in counterpart application No. 201010216197.4.

Office Action issued May 25, 2010, in counterpart Japanese Application No. 2008-069277.

European Search Report dated Dec. 17, 2010, issued in Application No. 10075181.7.

European Search Report issued in European Patent Application No. EP 08251483.7-2205, dated Aug. 6, 2008.

European Search Report issued in European Patent Application No. EP 08251483.7-2205, dated Dec. 8, 2008.

Communication dated Jan. 20, 2012 from the Taiwanese Patent Office in counterpart Taiwanese application No. 097109276.

Communication, dated Dec. 23, 2011, issued by the Intellectual Property Office of P.R. China in corresponding Chinese Application No. 200810088823.9.

Communication dated Mar. 29, 2012 issued by the European Patent Office in counterpart European Patent Application No. 10075181.7.

* cited by examiner

SURFACE LIGHT SOURCE USING WHITE LIGHT EMITTING DIODES AND LIQUID CRYSTAL DISPLAY BACKLIGHT UNIT HAVING THE SAME

CROSS-REFERENCE TO RELATED APPLICATIONS

This application is a Continuation of U.S. application Ser. No. 12/078,717 filed on Apr. 3, 2008, which claims the priorities of Korean Patent Application No. 2007-86197 filed on Aug. 27, 2007, and Korean Patent Application No. 2008-22437 filed on Mar. 11, 2008, in the Korean Intellectual Property Office, the disclosure of which is incorporated herein by reference.

BACKGROUND OF THE INVENTION

1. Field of the Invention

The present invention relates to a surface light source using white light emitting diodes (LEDs) and a liquid crystal display (LCD) backlight unit having the same, and more particularly, to a surface light source capable of producing uniform white light overall using white light emitting diodes, and an LCD backlight unit having the same.

2. Description of the Related Art

A cold cathode fluorescent lamp (CCFL) used as a light source of a conventional liquid crystal display (LCD) employs mercury gas, which may trigger environmental pollution. Besides, the CCFL is slow in response rate, low in color reproducibility and inappropriate for a smaller-sized and lighter-weight LCD panel.

In contrast, a light emitting diode (LED) is environment-friendly, high in response rate with several nano seconds, thus effective for a video signal stream and impulsively driven. Moreover, the LED is capable of reproducing color by 100% and varying brightness and color temperature by adjusting a light amount of red, green and blue LEDs. Also, the LED carries advantages suitable for a smaller-sized and lighter-weight LCD panel. Therefore, of late, the LED has been actively employed as a backlight source of the LCD panel.

An LCD backlight adopting the LED is broken down into an edge-type backlight and a direct-type backlight according to location of a light source. In the former, a light source of an elongated bar shape is disposed at an edge of the LCD panel to irradiate light onto the LCD panel using a light guide plate. In the latter, a surface light source with a substantially identical area to the LCD panel is disposed below the LCD panel to directly irradiate light onto the LCD panel.

FIGS. 1 and 2 illustrate arrangement of red (R), green (G) and blue (B) LEDs of a conventional surface light source.

The surface light source 10 for use in a conventional direct-type LCD panel emits white light by combining the red (R), green (G) and blue (B) light together. Thus, as shown in FIG. 1, a plurality of LED units (U) are arranged to define a square shape. In each of the LED units U, the red, green and blue LEDs 11, 12 and 13 are disposed within a proximity to respective vertices of a triangle. Alternatively, as shown in FIG. 2, a plurality of LED units U are arranged to define a triangular shape. However, when the LED units U are arranged to define a square shape as shown in FIG. 1, the red LEDs 11 are located with such density that a red line appears in the display.

Meanwhile, when the LED units U are arranged to define a triangular shape as shown in FIG. 2, the red, green and blue LEDs are relatively evenly disposed. However, a light source including the red, green and blue LEDs 11,12, and 13 in each of the LED units U is arranged such that the LED unit U can produce white light. Thus, to ensure the light source to maintain appropriate brightness level with respect to the other light sources adjacent thereto in the triangular shape, the LED units U should be balanced with one another and the light sources of each of the LED units should be balanced with one another in an overall backlight unit. This accordingly renders it hard to manufacture the backlight unit or degrades quality thereof.

Also, a difference in the light amount of the red, green and blue LEDs may adversely affect uniformity, or degrade contrast uniformity despite good color uniformity.

That is, the LED units are shown partially red or partially blue. Also, with higher temperature, each color is darkened more to hardly ensure a properly functional white surface light source.

Therefore, in the conventional surface light source 10 and the LCD backlight unit having the same, colors are added together with limitation, thereby not realizing uniformly-distributed white light.

SUMMARY OF THE INVENTION

An aspect of the present invention provides a surface light source capable of producing uniform white light using white light emitting diodes (LEDs) and a liquid crystal display (LCD) backlight unit having the same.

Another aspect of the present invention provides an LCD backlight unit having a surface light source capable of producing overall uniform white light using white light emitting diodes.

According to an aspect of the present invention, there is provided a surface light source using white light emitting diodes including: a plurality of white light emitting diodes arranged at a predetermined distance from one another, wherein the white light emitting diodes are arranged such that a light emitting diode unit defined by each of the white light emitting diodes and corresponding ones of the white light emitting diodes disposed at a closest distance from the each white light emitting diode has a central light amount ranging from 80% to 120% with respect to an average light amount of the white light emitting diodes.

The white light emitting diode may include: a blue light emitting diode chip; a red phosphor disposed around the blue light emitting diode chip, the red phosphor excited by the blue light emitting diode chip to emit red light; and a green phosphor disposed around the blue light emitting diode chip, the green phosphor excited by the blue light emitting diode chip to emit green light.

The blue LED used for the white LED may have a dominant wavelength of 430 to 456 nm.

The red light emitted from the red phosphor may have a color coordinate falling within a space defined by four coordinate points (0.6448, 0.4544), (0.8079, 0.2920), (0.6427, 0.2905) and (0.4794, 0.4633) based on the CIE 1931 chromaticity diagram, and the green light emitted from the green phosphor may have a color coordinate falling within a space defined by four coordinate points (0.1270, 0.8037), (0.4117, 0.5861), (0.4197, 0.5316) and (0.2555, 0.5030) based on the CIE 1931 chromaticity diagram.

An emission spectrum of the blue light emitting diode chip may have a full width at half-maximum of 10 to 30 nm, the green phosphor may have a full width at half-maximum of 30 to 100 nm and the red phosphor may have a full width at half-maximum of 50 to 200 nm.

The white light emitting diode may include an ultraviolet light emitting diode chip having a dominant wavelength of 250 to 420 nm, a red phosphor disposed around the ultraviolet light emitting diode chip to emit red light, a green phosphor emitting green light and a blue phosphor emitting blue light.

The white light emitting diodes may be arranged in a matrix of columns and rows having a spacing of 8.2 to 70 mm from one another, respectively. The white light emitting diodes may be arranged by adjusting at least one of spacing of columns, spacing of rows, and arrangement angles thereof.

The light emitting diode unit may have a shape selected from one of a polygon, a circle and a combination thereof.

The red phosphor may be represented by $CaAlSiN_3:Eu$ which is a nitride composition, or $(Ca,Sr)S:Eu$ which is a silicate composition.

The green phosphor may be represented by $(Ba_x, Sr_y, Mg_z)SiO_4:Eu^{2+}$, F, Cl, where $0<x$, $y\leq 2$, $0\leq z\leq 2$, 0 ppm$\leq$F, Cl$\leq$5000000 ppm, which is a silicate composition, $SrGa_2S_4:Eu$ which is a sulfide composition or $\beta$-SiAlON which is a nitride composition.

According to another aspect of the present invention, there is provided a a liquid crystal display backlight unit including: a board; a reflective plate disposed on the board; a surface light source disposed on the reflective plate, the surface light source including: a plurality of white light emitting diodes arranged at a predetermined distance from one another, wherein the white light emitting diodes are arranged such that a light emitting diode unit defined by each of the white light emitting diodes and corresponding ones of the white light emitting diodes disposed at a closest distance from the each white light emitting diode has a central light amount ranging from 80-% to 120-% with respect to an average light amount of the white light emitting diodes, a diffusing sheet disposed on the surface light source to diffuse light incident from the surface light source uniformly; and a light collecting sheet disposed on the diffusing sheet to collect the light diffused by the diffusing sheet.

The liquid crystal display backlight unit may further include a protective sheet disposed on the light collecting sheet.

According to still another aspect of the present invention, there is provided a liquid crystal display backlight unit including: a plurality of light emitting diode modules each including a conductive board having at least one first connector and a plurality of second connectors formed thereon, and an m×n number of white light emitting diode chips mounted on the conductive board, the white light emitting diode chips arranged in a matrix having an m number of rows and an n number of columns, where m and n are positive integers of at least two, respectively, wherein the m×n number of light emitting diode light sources are defined into a plurality of blocks, the plurality of blocks are connected to the first and second connectors to allow the white light emitting diode chips to be independently driven based on each of the blocks, the m×n number of white light emitting diode chips are arranged at a predetermined distance from one another, and the white light emitting diodes are arranged such that a light emitting diode unit defined by each of the white light emitting diodes and corresponding ones of the white light emitting diodes disposed at a closest distance from the each white light emitting diode has a central light amount ranging from 80% to 120% with respect to an average light amount of the white light emitting diodes.

The plurality of blocks may be commonly connected to the first connector, the plurality of second connectors are formed in a number identical to the blocks of each of the modules, and the plurality of blocks may be connected to the plurality of second connectors.

The light emitting diode modules may include 2 to 28 light emitting diode modules, each of the modules may include 1 to 28 blocks and each of the blocks may have 2 to 240 white light emitting diodes arranged therein.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Surface Light Source Using White LEDs

First, a surface light source using white light emitting diodes (LEDs) according to an exemplary of the invention will be described in detail with reference to FIGS. 3 and 4.

Figure 1:
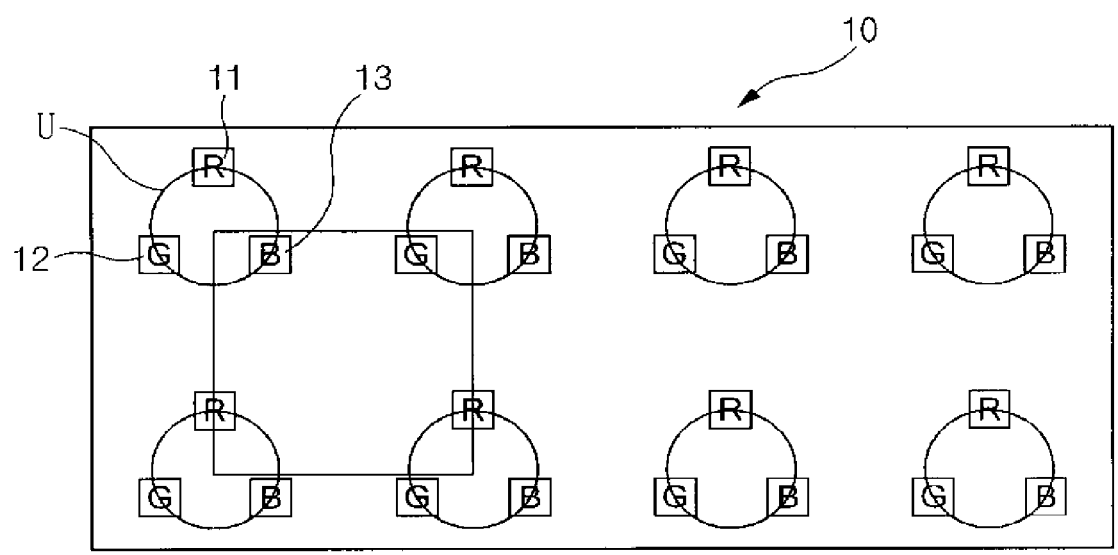
FIGS. 1 and 2 illustrate arrangement of red (R), green (G) and blue (B) LEDs of a conventional surface light source.
Figure 2:
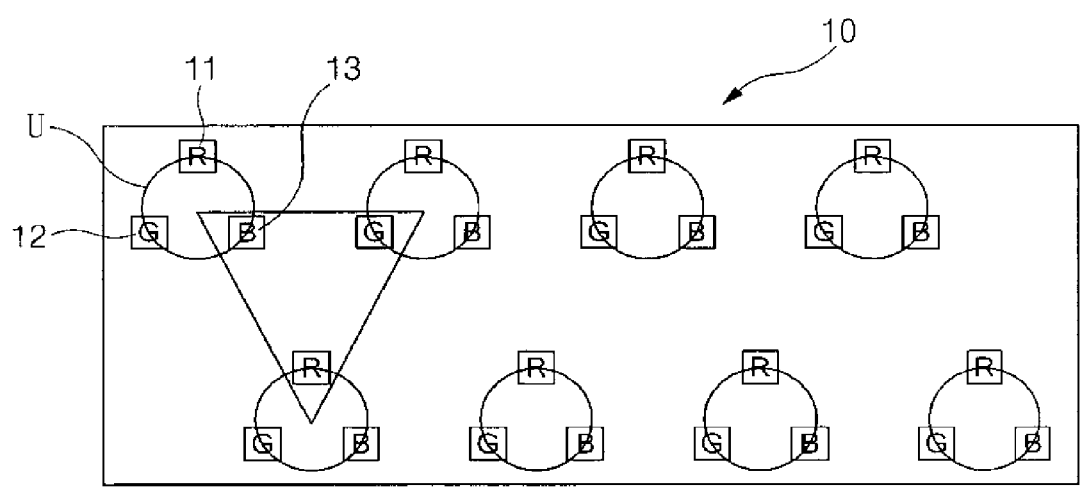
Figure 3:
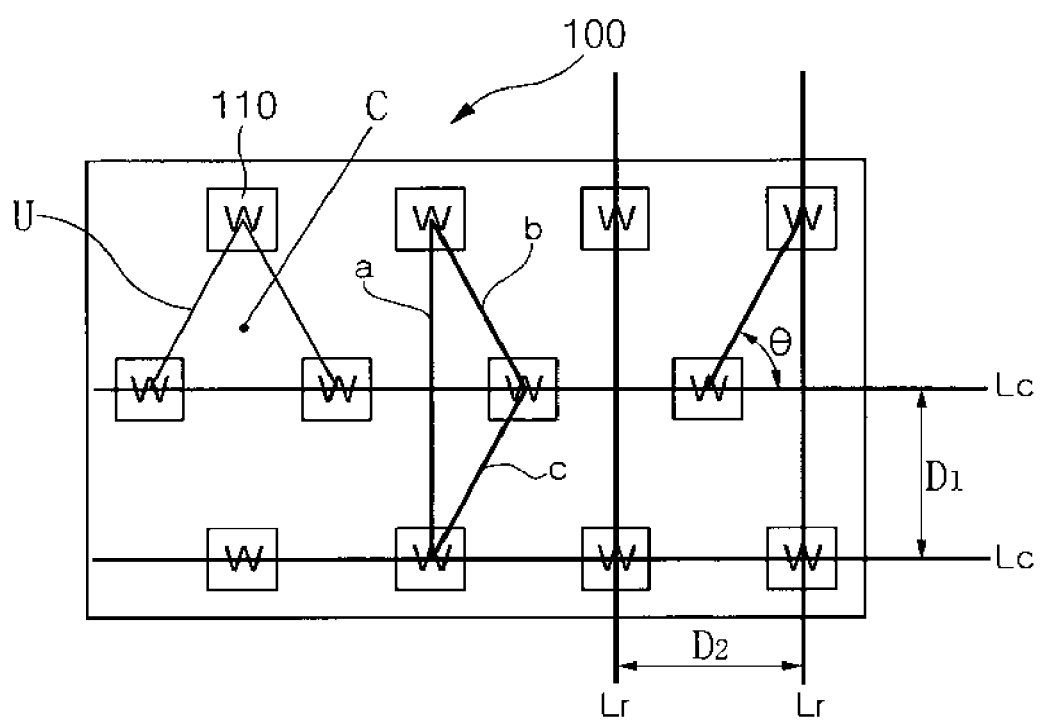
FIGS. 3 and 4 illustrate arrangement of a surface light source according to an exemplary embodiment of the invention.
Figure 4:
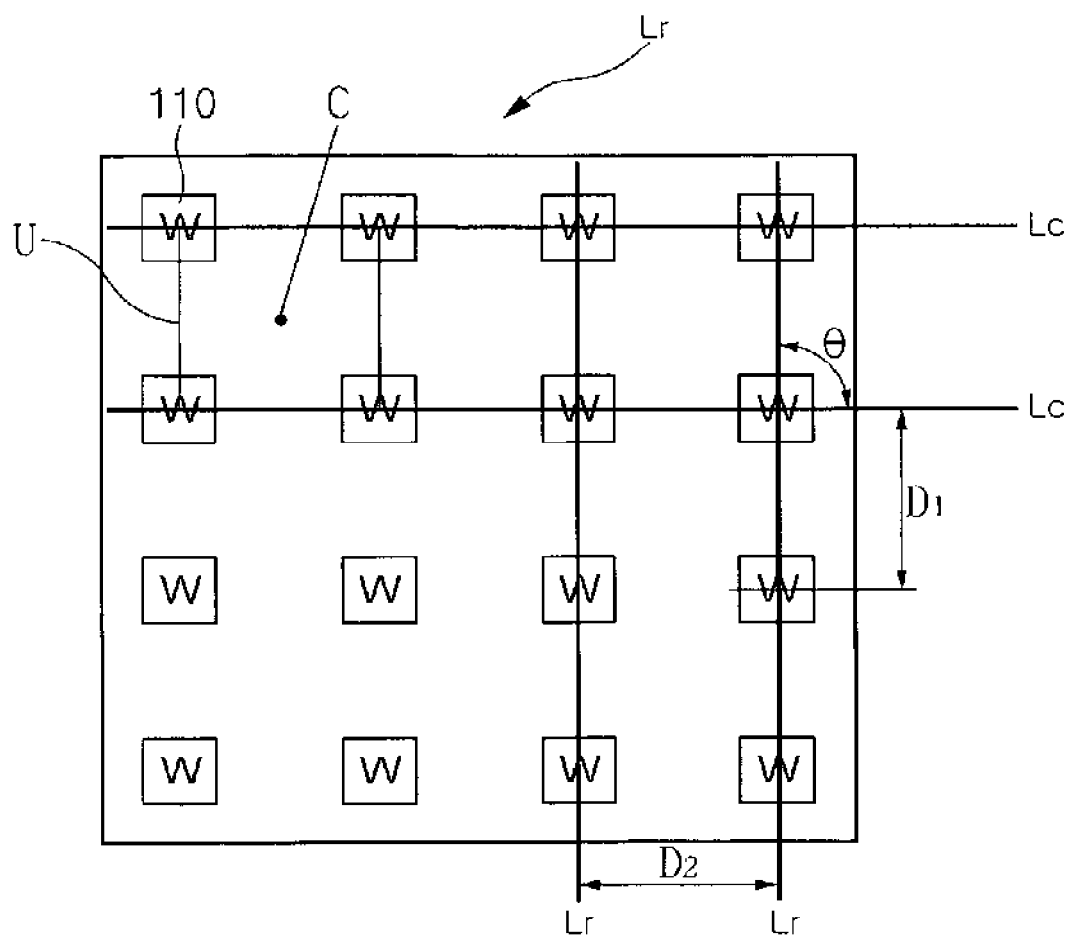

FIGS. 3 and 4 illustrate arrangement of white W LEDs of a surface light source according to the present embodiment.

As shown in FIGS. 3 and 4, the surface light source 100 using the white LED according to the present embodiment includes a plurality of white W LEDs 110 arranged at a predetermined distance from one another.

Although not illustrated, each of the white LEDs 110 may be formed of a blue LED chip, a red phosphor and a green phosphor. Alternatively, the white LED 110 may be formed of an ultraviolet (UV) LED chip, a red phosphor, a green phosphor and a blue phosphor. The red phosphor may utilize $CaAlSiN_3:Eu$ which is a nitride composition, or $(Ca,Sr)S:Eu$ which is a sulfide composition. Also, the green phosphor may adopt $(Ba_x,Sr_y,Mg_z)SiO_4:Eu^{2+}$, F, Cl ($0<x$, $y\leq 2$, $0\leq z\leq 2$, 0 ppm$\leq$F, Cl$\leq$5000000 ppm), which is a silicate composition, $SrGa_2S_4:Eu$ which is a sulfide composition, or $\beta$-SiAlON which is a nitride composition.

Moreover, the blue phosphor is formed of one of a silicate-based composition, a sulfide-based composition, a nitride-based composition, and an aluminate-based composition.

As described, when the white light is produced using the white LEDs 110, only one chip is utilized to ensure easier manufacture of the backlight unit and simpler configuration of a circuit than the conventional method in which white light is obtained using red, green and blue LEDs 11,12, and 13.

Particularly, in the present embodiment, the plurality of white LEDs are arranged by adjusting, e.g., spacing $D_1$ of rows Lc, spacing $D_2$ of columns Lr of the white LEDs 110 or arrangement angles (θ) thereof. The white light emitting diodes are arranged such that a light emitting diode unit U defined by each of the white LEDs 110 and corresponding ones of the white LEDs disposed at a closest distance from the each white light emitting diode has a light amount in a center C ranging from 80% to 120% with respect to an average light amount of the white LEDs 110. Here, the average light amount of the white LEDs 110 is derived by dividing a total light amount by the number of the white LEDs 110.

Here, the LED unit U may have a triangular shape as shown in FIG. 3. Alternatively, the LED unit U may have a square shape as shown in FIG. 4. Therefore, the center C of the LED unit U may be a weight center of the three white LEDs 110 in the triangular shape (see FIG. 3), or a weight center of the four white LEDs 110 in the square shape (see FIG. 4).

Figure 6A:
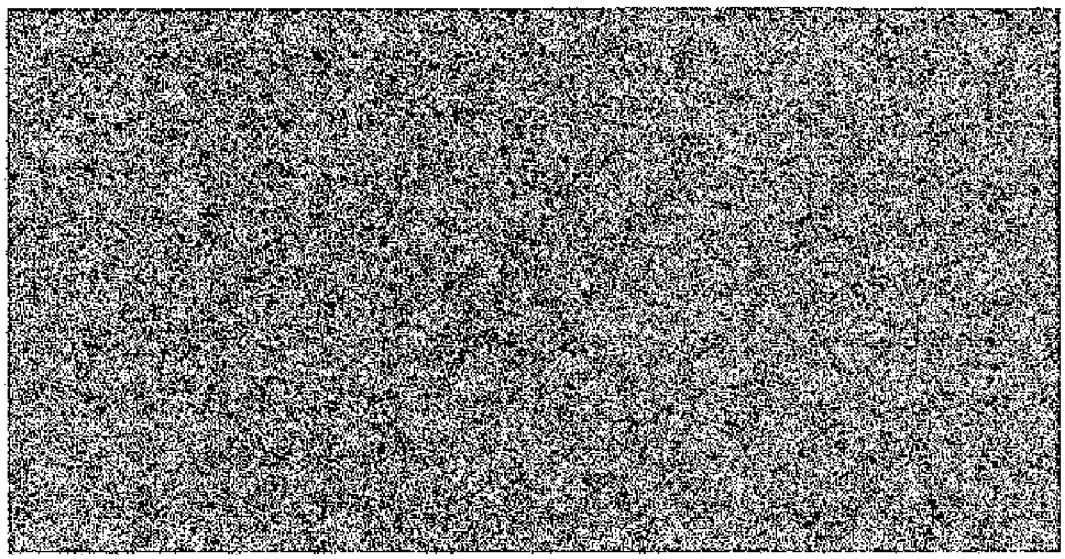
FIG. 6A illustrates a simulation test result of light amount uniformity when an average light amount of white LEDs is 80% to 120%.
Figure 6B:
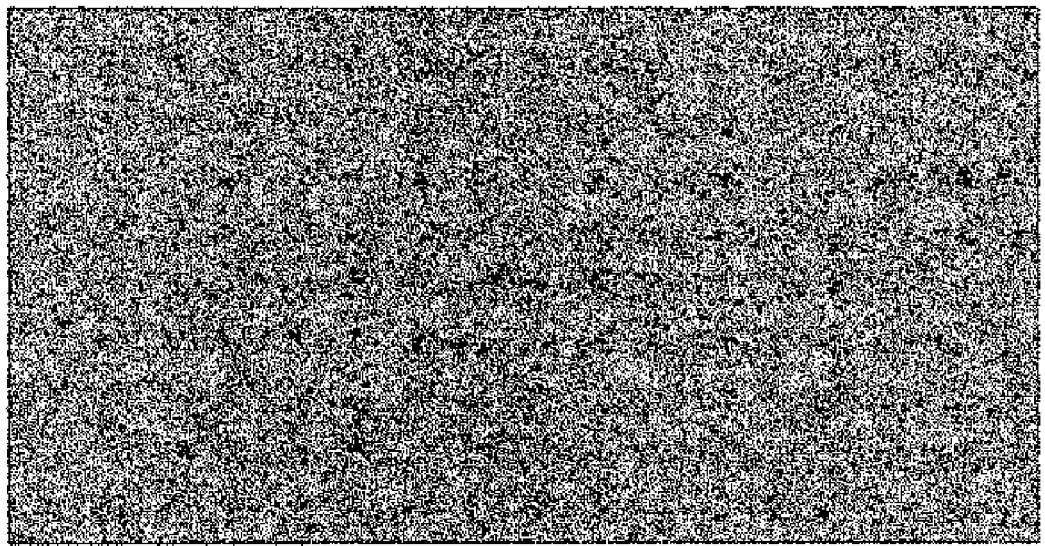
FIG. 6B illustrates a simulation test result of light amount uniformity when an average light amount of white LEDs is in excess of 20%.

Unlike the conventional configuration, the white light sources are arranged as in FIGS. 3 and 4 to define a polygon including a triangle. Here, the LED unit defined by the each light source and the corresponding ones of the light sources disposed at a closest distance, i.e., LEDs surrounding the center C as shown in FIGS. 3 and 4 has a central light amount, i.e., light amount measured in the center C ranging from 80 to 120% with respect to an average light amount. This ensures optimal uniformity as shown in FIG. 6A.

The LED unit U has a shape not limited to the aforesaid ones but may be variously shaped as one of a polygon including a triangle, a circle and a combination thereof within the scope of the present invention.

When all measurements are based on the center of the LED unit, in FIG. 3, a may be 20 to 140 mm, b and e may be adjusted in a range of 15 and 90 mm, respectively. That is, b and e, when are equal, assures optimal uniformity and b+e should be greater than a. Also, θ denotes an angle of one of the white LEDs located on a row line connecting an array of the white LEDs with respect to an adjacent one of the white LEDs located on another row line connecting an array of the white LEDs. For example, θ denotes an angle of b or e with respect to the line L connecting the array of the white LEDs. Referring to FIG. 3, θ ranging from 70 to 110° ensures optimal arrangement of the white LEDs. $D_1$, and $D_2$, when ranging from 8.2 to 70 mm ensure optical uniformity.

In a similar manner, as shown in FIG. 4, even when θ is substantially 90°, $D_1$, and $D_2$ range from 8.2 to 70 mm, respectively to ensure optimal arrangement.

The arrangement described above may employ light sources satisfying following conditions. Such arrangement is expected to result in superior color reproducibility and improve brightness.

The white LED light source of the present embodiment may include a blue chip having a dominant wavelength of 430 to 456 nm, a red phosphor disposed around the blue LED chip and excited by the blue LED chip to emit red light and a green phosphor disposed around the blue LED chip and excited by the blue LED chip to emit green light.

The red phosphor may have a color coordinate falling within a space defined by four coordinate points (0.6448, 0.4544), (0.8079, 0.2920), (0.6427, 0.2905) and (0.4794, 0.4633) based on the CIE 1931 chromaticity diagram. The green phosphor may have a color coordinate falling within a space defined by four coordinate points (0.1270, 0.8037), (0.4117, 0.5861), (0.4197, 0.5316) and (0.2555, 0.5030) based on the CIE 1931 chromaticity diagram.

Figure 9:
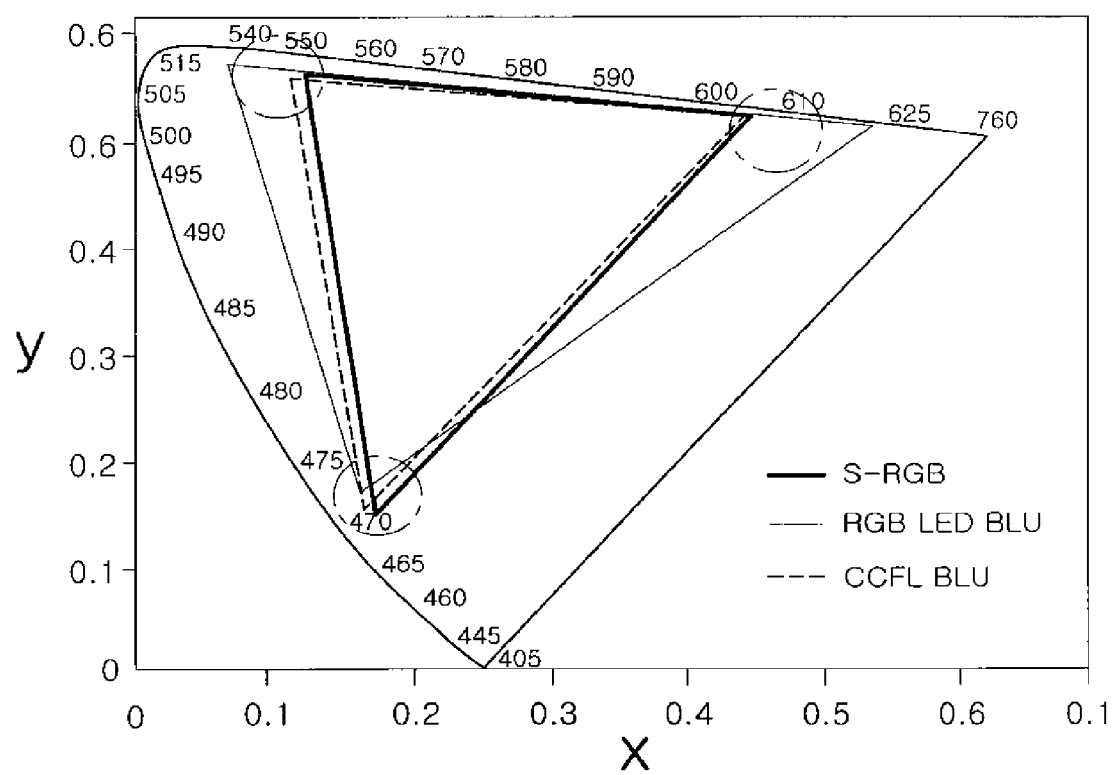
FIG. 9 illustrates a color coordinate range obtained when white LED light sources are employed in an LCD backlight unit.

The LCD backlight unit employing the white LED light source exhibits high color reproducibility as represented by a color coordinate space corresponding to an s-RGB area on the CIE 1976 chromaticity diagram (see FIG. 9). This high color reproducibility cannot be achieved by virtue of a CCFL BLU, a combination of red, blue and green LEDs. i.e., RGB LED BLU and a conventional combination of a blue LED chip, and red and green phosphors.

Furthermore, an emission spectrum of the blue LED chip has a full width at half-maximum (FWHM) of 10 to 30 nm, the green phosphor 105 may have an FWHM of 30 to 100 nm and the red phosphor may have an FWHM of 50 to 200 nm. Each of the light sources has an FWHM ranging as described above, thereby producing white light with better color uniformity and color quality. Such FWHM conditions may be beneficially employed to enhance performance of the white LED light source. This FWHM range may be more beneficially applied in combination with other conditions such as the dominant wavelength of the blue LED chip and color coordinates of the red phosphor and green phosphor as described above.

Particularly, the blue LED chip may have a dominant wavelength set to a range of 430 and 456 nm and an FWHM set to a range of 10 to 30 nm. This significantly enhances efficiency of a $CaAlSiN_3$:Eu red phosphor and efficiency of a $(Ba_x, Sr_y, Mg_z)SiO_4$:$Eu^{2+}$, F, Cl (0<x, y≦2, 0≦z≦2, 0 ppm≦F, Cl≦5000000 ppm) green phosphor.

That is, according to the present embodiment, the white LEDs 110 employed can be arranged with much less limitation than the conventional surface light source using the red, green and blue LEDs.

Moreover, according to the present embodiment, as described above, the LED unit U has a light amount in the center C ranging from 80% to 120% with respect to an average light amount of the white LEDs 110, thereby ensuring a uniform light amount, and stable production and quality.

Here, in a case where the LED unit U has a light amount in the center C smaller than 80% of an average light amount of the white LEDs 110, the white LEDs 110 are degraded in power efficiency to increase temperature and consumption power, thereby undermining uniformity. In a case where the LED unit U has a light amount in the center C greater than 120%, brightness can be increased but the white LEDs 110 employed in a great number result in higher costs, posing difficulty to manufacture of the backlight unit.

Therefore, in the present embodiment, the white LEDs 110 are arranged such that the LED unit U has a light amount in the center C set to the aforesaid range, thereby obtaining optimal uniformity.

LCD Backlight Unit Having a Surface Light Source Using White LEDs

The surface light source as described above may be employed in an LCD backlight unit backlighting an LCD panel in an LCD.

Hereinafter, the LCD backlight unit having a surface light source using white LEDs will be described with reference to FIG. 5.

Figure 5:
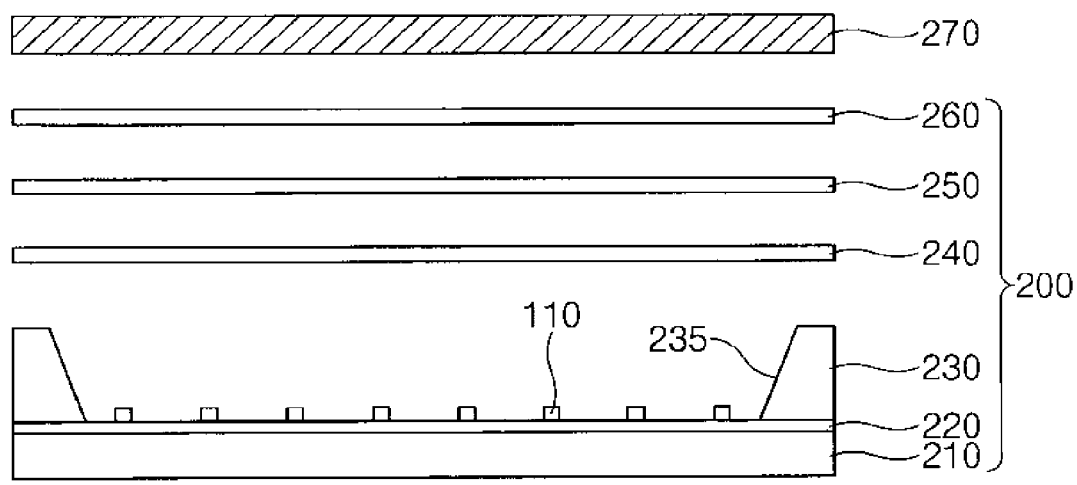
FIG. 5 is an exploded side sectional view illustrating an LCD backlight unit having a surface light source using white light emitting diodes (LEDs) according to an exemplary embodiment of the invention.

FIG. 5 is an exploded side sectional view illustrating an LCD backlight unit having a surface light source using white LEDs.

As shown in FIG. 5, according to the present embodiment, the LCD backlight unit 200 disposed behind an LCD panel 270 includes a board 210, a reflective plate 220 disposed on the board 210 and a surface light source including white LEDs 110. The reflective plate 220 reflects light emitted from the white LEDs 110 upwards.

The surface light source is disposed on the reflective plate 220. As described with reference to FIGS. 3 and 4, the plurality of white LEDs 110 are arranged at a predetermined distance from one another. The white LEDs 110 are arranged by adjusting spacing $D_1$ of columns, spacing $D_2$ of rows $D_2$ or arrangement angles θ thereof. Here, the white LEDs 110 are arranged such that a light emitting diode unit U defined by each of the white LEDs 110 and corresponding ones of the white LEDs disposed at a closest distance from the each white light emitting diode has a central light amount ranging from 80% to 120% with respect to an average light amount of the white LEDs.

A side wall 230 is formed at an edge of the reflective plate 220 to surround the white LEDs 110. The side wall 230 has an inclination surface 235. Here, the inclination surface 235 of the side wall 230 may be additionally applied with a reflective material to ensure light emitted sideward from the white LEDs 110 to be directed upward.

A diffusing sheet 240 is provided on the surface light source to uniformly diffuse light incident from the surface light source, thereby preventing light from being concentrated locally.

A light collecting sheet 250 is disposed on the diffusing sheet 240 to collect the light diffused from the diffusing sheet 240 in a direction perpendicular to the LCD panel 270.

Here, a protective sheet 260 may be further disposed on the light collecting sheet 250 to protect an underlying optical structure. The protective sheet 260 serves to protect a surface of the light collecting sheet 250 while contributing to uniform distribution of light.

An LCD panel 270 is disposed on the protective sheet 260. The LCD backlight unit 200 of the present embodiment irradiates uniform white light onto the LCD panel by virtue of the surface light source using the white LEDs 110, thereby ensuring a clear LCD image.

Separately Driven LCD Backlight Unit

The arrangement of the white LEDs described above is applicable to a separately driven LCD backlight unit.

In the present embodiment, the board 210 may be a conductive board where at least one first connector and a plurality of second connectors are formed to enable flow of positive and negative currents. The separately driven LCD backlight unit includes a plurality of white LED modules mounted on the conductive board to be arranged in a matrix having an m number of rows and an n number of columns, where m and n are positive integers of at least two. The m×n number of LED light sources are defined into a plurality of blocks. The plurality of blocks are connected to the first and second connectors to independently drive the white LED chips based on each of the blocks.

In the connector configuration for separate driving, the blocks are commonly connected to the first connector and the second connectors are identical in number to the blocks of each of the modules. The plurality of blocks are connected to the second connectors, respectively.

In the separately driven LCD backlight of the present embodiment, the number of LED modules, the number of blocks of the LED module and/or the number of the white LED chips in the each block may be adequately adjusted to ensure an appropriate number of LED chips and arrangement for attaining light amount necessary for the separately driven LCD backlight unit.

The number of the LED modules may be 2 to 28, the number of the blocks may be 1 to 28 for the each module and the number of the white LEDs may be 2 to 240 for the each block.

Particularly, in a case where the LCD backlight unit is utilized in a 40-inch LCD, the LED module may include 1 to 14 blocks. In a case where the LCD backlight unit is used in a 46-inch LCD, the LED module may include 1 to 15 blocks. Given the assumption that an active area of the 46-inch LCD TV is 1020×580 mm, when the number of the LEDs for the each block is 2 to 240, a total 4 to 100800 of LEDs will be employed.

Meanwhile, in a larger-sized backlight unit, the number of modules may be increased to employ a necessary number of LED chips easily. Specifically, the LED module may include 1 to 28 blocks and 2 to 240 white LEDs may be arranged in the each block of the LED modules.

Notably, in a case where the LCD backlight unit is utilized in a 52 inch LCD, the number of the LED modules may be 4 to 12. Also, in a case where the LCD backlight unit is adopted in a 57 inch LCD, the number of the LED modules may be 6 to 20.

Figure 7:
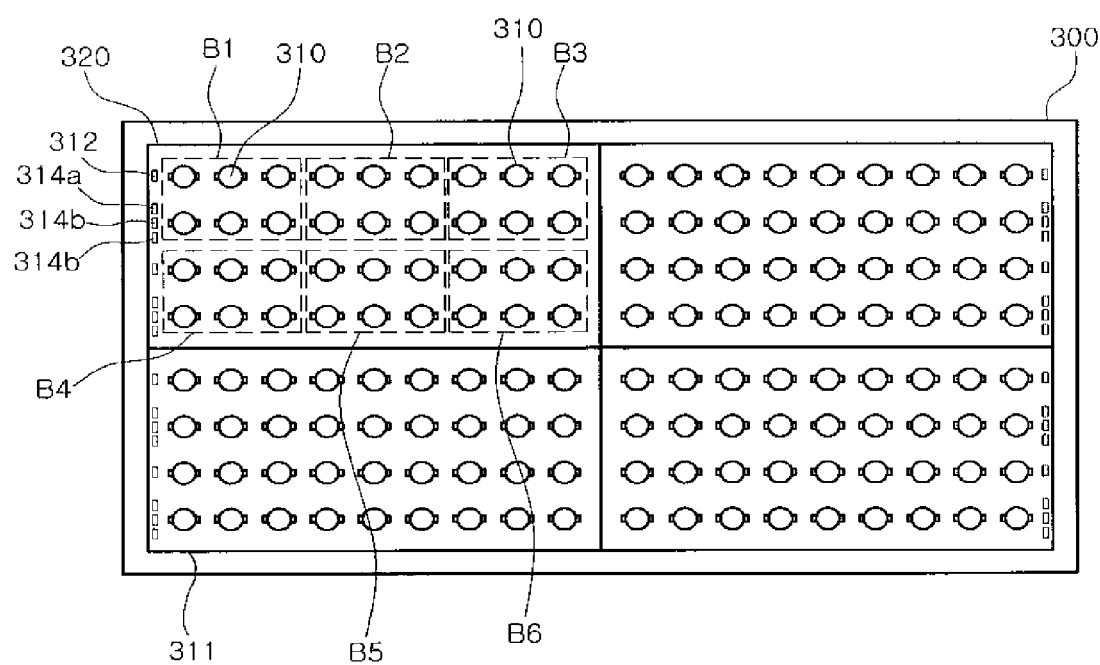
FIG. 7 illustrates arrangement of light sources in a separately driven liquid crystal display (LCD) backlight unit according to an exemplary embodiment of the invention.

As shown in FIG. 7, an LCD backlight unit 300 according to an exemplary embodiment of the present invention includes four LED modules 320. Each of the LED modules 320 includes a conductive board 311, and a plurality of LED chips 310 mounted on the conductive board 311. The LED chips 310 are white LEDs arranged in a matrix having four rows and nine columns.

The LED module 320 may be defined into six blocks B1 to B6. In the present embodiment, the blocks B1 to B6 constituting the LED module 320 serve as respective units which can be driven independently.

As in the present embodiment, the LED chips 310 in each of the blocks B1 to B6 may be connected in series with one another. Here, the each block B1 to B6 as a circuit has at least one end connected to an individual connector so that the LED chips 310 can be separately driven based on the respective units.

To ensure connection for this separate driving, the conductive board 311 of the LED module 320 is illustrated to include two first connectors 312 and six second connectors 314a, 314b, and 314c. The first and second connectors 312, and 314a, 314b, 314c are connected to different polarities from each other to provide an external voltage to the LED chips 310.

Figure 8:
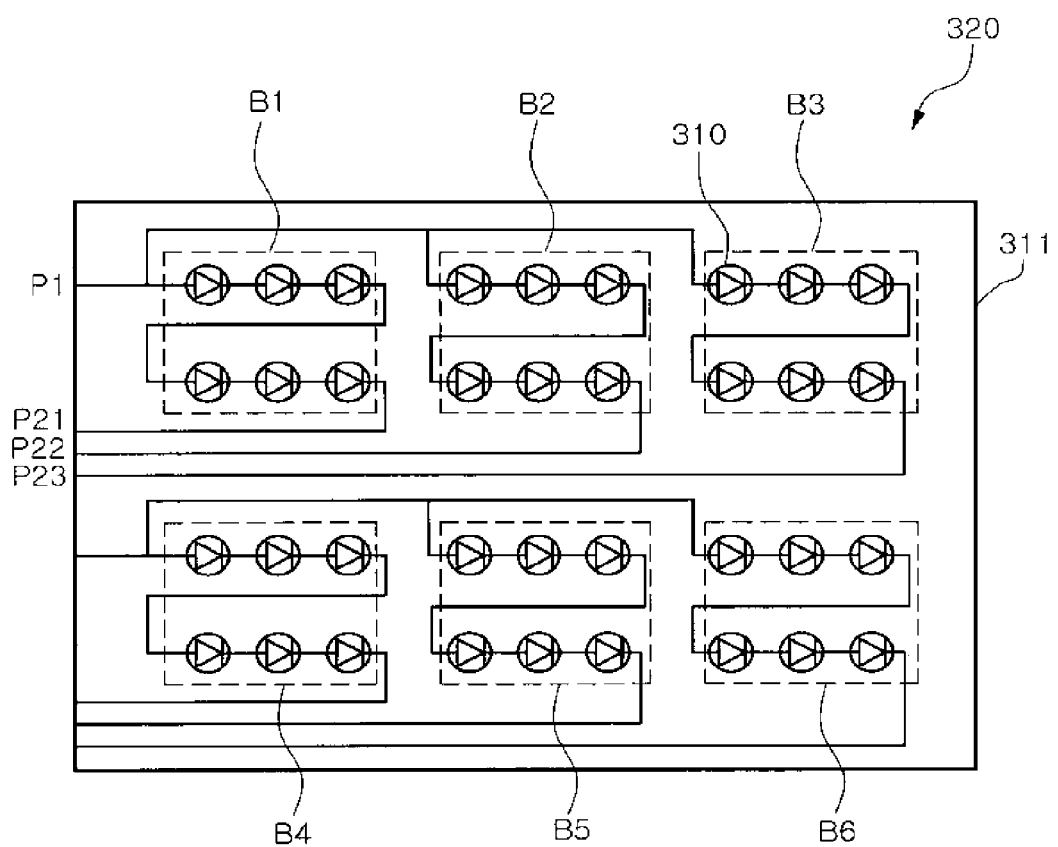
FIG. 8 is a view for explaining a circuit configuration for separate driving in a separately driven LCD backlight unit shown in FIG. 7.

FIG. 8 illustrates a circuit configuration for separate driving in the separately driven LCD backlight of FIG. 7.

Referring to FIG. 8, an LED module 320 includes a conductive board 311 and a plurality of LED chips 310 arranged on the conductive board 311 in a matrix having four rows and nine columns.

In the LED module 320, the LED chips 310 are defined into six blocks B1 to B6 as described in FIG. 8.

In the present embodiment, six white LED chips 310 in the first and second rows and corresponding three columns of the nine columns define first to third blocks B1 to B3, respectively. In a similar manner, six white LED chips 310 in the third and fourth rows and corresponding three columns of the nine columns define fourth to sixth blocks B4 to B6, respectively.

The LED chips 310 of each of the blocks are connected in series with one another. In a circuit configuration where the first to third blocks B1, B2, and B3 are connected in series with one another, a plus (+) terminal is commonly connected to a first connector P1 and a minus (−) terminal is divided based on the each block to connect to respective three second connectors P21, P22, and P23.

Likewise, in a circuit configuration where the fourth to sixth blocks B4, B5, and B6 are connected in series with one another, a plus (+) terminal is commonly connected to a first connector and a minus (−) terminal is divided based on the each block to connect to respective three second connectors. Here, reference numerals P1, and P21, P22, P23 of FIG. 8 are construed to correspond to the first and second connectors, respectively shown in FIG. 7.

As described above, the separately driven LCD backlight unit of the present invention realizes a structure necessary for separate driving using the unit of blocks. The separate driving LCD backlight unit can be defined largely into three blocks, and the necessary number of LEDs may be adjusted.

More specifically, in the separately driven LCD backlight unit, the white LEDs are arranged in a matrix having a plurality of rows and columns to ensure uniform density overall. Also, the white LEDs can be arranged by adjusting the number of the LED modules, the number of the blocks for enabling separate driving in the LED module and the number of the LED chips in the each block, thereby assuring an appropriate number of the LED chips according to area. As a result, the white LEDs can be arranged easily in a necessary number to have adequate density. This consequently improves local dimming effect and overall color uniformity in a medium or large-sized display.

Hereinafter, a description will be given of a suitable number of LEDs and numbers of respective units such as the LED modules, blocks and chips for each block according to size of the backlight unit (BLU).

Here, the BLUs are applied to displays with representative sizes of 40 inch, 46 inch, 52 inch and 57 inch.

First, a total required light amount (unit: lumens) for the BLUs of each size can be set to 7000, 8000, 93000, and 13000, respectively. The number of LED chips satisfying such a total required light amount can be determined by a light amount of the unit LED chip as shown in Table 1.

A necessary number of the LED chips with 4, 8, 10, and 15 lumens, respectively for general use can be noted as in Table 1.

TABLE 1

|  |  | BLU size (inch) | | | |
|---|---|---|---|---|---|
|  |  | 40 | 46 | 52 | 57 |
| Total required light amount (lumens) | | 7000 | 8000 | 9300 | 13000 |
| Number of LEDs according to unit LED light amount | 4 lumens LED | 1750 | 2000 | 2325 | 3250 |
| | 8 lumens LED | 875 | 1000 | 1162 | 1625 |
| | 10 lumens LED | 700 | 800 | 930 | 1300 |
| | 15 lumens LED | 466 | 533 | 622 | 866 |

As shown in Table 1, a necessary number of the LED chips may be slightly varied according to a unit light amount of the LED chips used. A great number of the LED chips need to be arranged suitably to ensure optimum density considering color uniformity and brightness.

To ensure that this arrangement allows for various areas and numbers more easily, according to the present embodiment, the number of LED modules, the number of blocks for each module, the number of LED chips for each block should be adequately selected to obtain optimum brightness and color uniformity.

To satisfy conditions shown in Table 1, the number of LED modules, the number of blocks for each module, and the number of LED chips for each block can be selected in the BLU of each size, as noted in Table 2.

TABLE 2

|  | BLU size (inch) | | | |
|---|---|---|---|---|
|  | 40 | 46 | 52 | 57 |
| Number of LED chips | 466~1750 | 533~2000 | 622~2325 | 866~3250 |
| Number of modules | 6~12 | 6~12 | 6~12 | 6~20 |
| Number of blocks | 4~14 | 5~15 | 6~28 | 6~28 |
| Number of LED chips for each block | 6~24 | 6~24 | 6~24 | 6~24 |

In a case where the BLU is utilized in LCDs of a medium size such as 40 inch, and 46 inch, the number of the LED modules and the number of the LED chips for the each block may be selected identically. In a case where the LCD BLU is employed in a 40-inch LCD, each of the LED modules is defined into 4 to 14 blocks. Also, in a case where the LCD BLU is used in a 46-inch LCD, the LED module may include 5 to 15 blocks. Of course, the number of the modules and the number of the chips for the each block can be varied appropriately in a range shown in Table 2.

Moreover, in a case where the LCD BLU is utilized in LCDs with a relatively big size of 52 inch and 57 inch, the number of the blocks for the each LED module may be selected to range from 6 to 28, and the number of the LED chips for the each block may be selected to range from 6 to 24. In a case where the LCD BLU is utilized in a 52 inch LCD, the number of the modules may be 6 to 12. Also, in a case where the LCD BLU is used in a 57 inch LCD, the number of LED modules may be 6 to 20.

Of course, the white LEDs for use in the separately driven LCD backlight unit may be any type of the white LED light sources described above (see "surface light source using white LEDs").

As set forth above, according to exemplary embodiments of the invention, in a surface light source using white LEDs and an LCD backlight unit having the same, white LEDs can be arranged appropriately to produce uniform white light overall. Also, unlike a conventional surface light source including a combination of red, green and blue LEDs, only one-chip, i.e., white LEDs are employed to allow the LEDs to be arranged with less limitation. This also ensures easier manufacture of the backlight unit and simpler configuration of circuits.

In addition, uniform white light can be irradiated onto an LCD panel to assure a clearer LCD image.

While the present invention has been shown and described in connection with the exemplary embodiments, it will be apparent to those skilled in the art that modifications and variations can be made without departing from the spirit and scope of the invention as defined by the appended claims.

What is claimed is:

1. A light source using white light emitting diodes comprising:
   a plurality of white light emitting diodes arranged at a predetermined distance from one another,
   wherein the white light emitting diodes are arranged such that a light emitting diode unit defined by each of the white light emitting diodes and a corresponding one of the white light emitting diodes disposed at a closest distance from the each white light emitting diode has a central light amount ranging from 80% to 120% with respect to an average light amount of the white light emitting diodes, and the white light emitting diode comprises a blue light emitting diode chip having a dominant wavelength of 430 to 456 nm, a red phosphor emitting red light and a green phosphor emitting green light, wherein the red light emitted from the red phosphor has a color coordinate falling within a space defined by four coordinate points (0.6448, 0.4544), (0.8079, 0.2920), (0.6427, 0.2905) and (0.4794, 0.4633) based on the CIE 1931 chromaticity diagram, and the green light emitted from the green phosphor has a color coordinate falling within a space defined by four coordinate points (0.1270, 0.8037), (0.4117, 0.5861), (0.4197, 0.5316) and (0.2555, 0.5030) based on the CIE 1931 chromaticity diagram.

2. The light source of claim 1, further comprising a diffusing sheet, wherein the central light amount is measured at the diffusing sheet disposed on a surface of the light source.

3. The light source of claim 1, wherein the red phosphor is represented by one of $CaAlSiN_3$:Eu and (Ca, Sr)S:Eu.

4. The light source of claim 1, wherein the green phosphor is represented by one of $(Ba_x, Sr_y, Mg_z)SiO_4:Eu^{2+}$, F, Cl, where $0<x$, $y\leq2$, $0\leq z\leq2$, 0 ppm$\leq$F, Cl$\leq$5000000 ppm, $SrGa_2S_4$:Eu and β-SiAlON.

5. A liquid crystal display backlight unit comprising:
a plurality of light emitting diode modules each comprising a conductive board having at least one first connector and a plurality of second connectors formed thereon, and white light emitting diode chips mounted on the conductive board, wherein:
the white light emitting diode chips are arranged at a predetermined distance from one another, and
the white light emitting diodes are arranged such that a light emitting diode unit defined by each of the white light emitting diodes and a corresponding one of the white light emitting diodes disposed at a closest distance from the each white light emitting diode has a central light amount ranging from 80% to 120% with respect to an average light amount of the white light emitting diodes.

6. The liquid crystal display backlight unit of claim 5 further comprising a diffusing sheet, wherein the central light amount is measured at the diffusing sheet.

7. A display device comprising:
a display panel; and
a backlight unit which irradiates light to the display panel, wherein the backlight unit comprises:
a plurality of white light emitting diodes arranged at a predetermined distance from one another,
wherein the white light emitting diodes are arranged such that a light emitting diode unit defined by each of the white light emitting diodes and a corresponding one of the white light emitting diodes disposed at a closest distance from each white light emitting diode has a central light amount ranging from 80% to 120% with respect to an average light amount of the white light emitting diodes, and the white light emitting diode comprises a blue light emitting diode chip having a dominant wavelength of 430 to 456 nm, a red phosphor emitting red light and a green phosphor emitting green light, wherein the red light emitted from the red phosphor has a color coordinate falling within a space defined by four coordinate points (0.6448, 0.4544), (0.8079, 0.2920), (0.6427, 0.2905) and (0.4794, 0.4633) based on the CIE 1931 chromaticity diagram, and the green light emitted from the green phosphor has a color coordinate falling within a space defined by four coordinate points (0.1270, 0.8037), (0.4117, 0.5861), (0.4197, 0.5316) and (0.2555, 0.5030) based on the CIE 1931 chromaticity diagram.

8. The display device of claim 7, the backlight unit further comprising a diffusing sheet, wherein the central light amount is measured at the diffusing sheet.

9. The display device of claim 7, wherein the display panel is a liquid crystal panel.

10. The display device of claim 7 further comprising a driving circuit which drives the backlight unit.

11. A television comprising the display device of claim 7.

12. A display device comprising:
a display panel; and
a backlight unit which irradiates light to the display panel, wherein the backlight unit comprises:
a plurality of light emitting diode modules each comprising a conductive board having at least one first connector and a plurality of second connectors formed thereon, and a plurality of white light emitting diode chips mounted on the conductive board, wherein
the white light emitting diode chips are arranged at a predetermined distance from one another, and
the white light emitting diodes are arranged such that a light emitting diode unit defined by each of the white light emitting diodes and a corresponding one of the white light emitting diodes disposed at a closest distance from the each white light emitting diode has a central light amount ranging from 80% to 120% with respect to an average light amount of the white light emitting diodes.

13. The display device of claim 12, the backlight unit further comprising a diffusing sheet, wherein the central light amount is measured at the diffusing sheet.

14. The display device of claim 12, wherein the display panel is a liquid crystal panel.

15. The display device of claim 12 further comprising a driving circuit which drives the backlight unit.

16. A television comprising the display device of claim 12.

* * * * *